US010686978B2

(12) United States Patent
Ina

(10) Patent No.: US 10,686,978 B2
(45) Date of Patent: Jun. 16, 2020

(54) IMAGE SENSOR AND MODULE CONFIGURATION NOTIFICATION METHOD FOR IMAGE SENSOR

(71) Applicant: OMRON Corporation, Kyoto (JP)

(72) Inventor: Hirofumi Ina, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/188,288

(22) Filed: Nov. 13, 2018

(65) Prior Publication Data
US 2019/0268528 A1 Aug. 29, 2019

(30) Foreign Application Priority Data

Feb. 23, 2018 (JP) ................. 2018-031004

(51) Int. Cl.
| | |
|---|---|
| *H04N 5/232* | (2006.01) |
| *H04N 7/18* | (2006.01) |
| *H04N 5/225* | (2006.01) |
| *G03B 17/14* | (2006.01) |
| *H04N 1/00* | (2006.01) |

(52) U.S. Cl.
CPC ......... *H04N 5/23206* (2013.01); *G03B 17/14* (2013.01); *H04N 1/00538* (2013.01); *H04N 5/2253* (2013.01); *H04N 5/2254* (2013.01); *H04N 5/2256* (2013.01); *H04N 5/23209* (2013.01); *H04N 5/23216* (2013.01); *H04N 7/181* (2013.01)

(58) Field of Classification Search
CPC ................................ H04N 5/23206
USPC .................................................... 348/231.99
See application file for complete search history.

(56) References Cited

U.S. PATENT DOCUMENTS

| | | |
|---|---|---|
| 2007/0283253 A1 | 12/2007 | Asakimori et al. |
| 2018/0054595 A1 | 2/2018 | Odamaki et al. |

FOREIGN PATENT DOCUMENTS

| | | |
|---|---|---|
| JP | 2007214682 | 8/2007 |

OTHER PUBLICATIONS

"Search Report of Europe Counterpart Application", dated May 29, 2019, p. 1-p. 9.

*Primary Examiner* — Joel W Fosselman
(74) *Attorney, Agent, or Firm* — JCIPRNET

(57) ABSTRACT

An image sensor includes an imaging system configured by combining of modularized components; and a processing part executing a process using an image acquired by the imaging system. Each of the components includes a memory storing information specifying the component. The image sensor further includes: a collection part collecting the information specifying the component from the memory; a storage part storing information representing a combination of the components of the image sensor and data to be used when the image sensor having the components indicated by the combination executes the process; a comparison part comparing a combination of its components with the combination of the components of the image sensor represented by the information stored in the storage part; and a notification part sending a notification based on a result of comparison.

13 Claims, 7 Drawing Sheets

IMAGE SENSOR AND MODULE CONFIGURATION NOTIFICATION METHOD FOR IMAGE SENSOR

CROSS-REFERENCE TO RELATED APPLICATION

This application claims the priority benefit of Japan Application No. 2018-031004, filed on Feb. 23, 2018. The entirety of the above-mentioned patent application is hereby incorporated by reference herein and made a part of this specification.

BACKGROUND

Technical Field

The disclosure relates to an image sensor used in a production line of a factory, etc. and particularly relates to a modular image sensor constituted by a combination of multiple modules and a module configuration notification method for the image sensor.

Description of Related Art

In the production line of a factory, a system called image sensor is frequently used for automating the inspection and management of products and saving labor. In the past, the configuration that connects a camera and an image processing device with a cable is common (see Japanese Laid-open No. 2007-214682), but recently a processing-integrated image sensor has also been launched which integrates the camera and the image processing device so as to perform from imaging to image processing with a single device. Such a processing-integrated image sensor is also called a "smart camera" and may be formed by integrating illuminations and lenses.

Problems to be Solved

In order to carry out stable inspection with the image sensor, it is desirable to optimize the model (type), specification and performance of the illuminations, lenses, and imaging elements according to the imaging environment, the object to be inspected, the purposes, etc. Therefore, makers who provide smart cameras have lined up a large number of products such as illuminations, lenses, imaging elements, etc., with the model (type), specification and performance changed little by little, for the user to select the one with the optimum specification.

However, as the IoT (Internet of Things) development of factories is accelerating, the range of application of smart cameras has expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. so that change of the object to be inspected enters a short cycle to be optimum for the inspection. Thus, in the recent years, the so-called modular smart camera has been introduced, which respectively modularizes the illuminations, lenses, and imaging elements for the user to freely combine the illuminations, lenses, and imaging elements. For example, if the maker provides five types of illumination modules, lens modules, and imaging element modules, there are 125 possible combinations, from which the user can select a combination that matches the required specification.

Use of the modular image sensor has the merits of reducing product variations for the makers and increasing choices and flexibility for the user. On the other hand, the following demerits raise concerns.

For example, during maintenance of the modular image sensor described above, the module attached to the image sensor may be replaced. In addition, for example, when a new image sensor is installed by copying the module configuration that is being used in the above-described modular image sensor, data (hereinafter referred to as "scene data") including setting values such as inspection programs and various parameters that are being used in the copy source image sensor is applied to be operated in the copy destination image sensor that is newly installed.

In the case of the conventional image sensor, since the device configuration is fixed, using the same scene data before and after the maintenance may not result in any problem. For example, if the model numbers of the copy source image sensor and the copy destination image sensor are the same, applying the scene data that has been used in the copy source image sensor to the copy destination image sensor will not cause any problem. In the case of the modular image sensor, however, there is no guarantee that the substitute module will operate normally if the image sensor uses the scene data before the maintenance, or that the modules of the copy source image sensor and the copy destination image sensor will always match each other. Further, since the user checks each image sensor to determine whether the module configuration of the image sensor is consistent before and after the maintenance or whether the module configurations of the copy source image sensor and the copy destination image sensor match each other, there is a concern that the user may make an erroneous determination. As a result, the image sensor may encounter trouble due to use of inappropriate scene data, or the image sensor may operate with the inappropriate scene data and not perform the inspection that the user intends to perform.

The disclosure has been made in view of the above and aims to provide a technique for supporting application of appropriate data corresponding to the module configuration in the modular image sensor.

SUMMARY

Means for Solving the Problems

The first aspect of the disclosure provides an image sensor, including: an imaging system configured by combining a plurality of modularized components; and a processing part executing a process using an image acquired by the imaging system, wherein each of the components includes a non-volatile memory storing information for specifying the component, and the image sensor further includes: a collection part collecting the information for specifying the component from the memory of each of the components; a storage part storing information representing a combination of the components of the image sensor and data to be used when the image sensor including the components indicated by the combination executes the process; a comparison part comparing a combination of its components specified by the information collected by the collection part with the combination of the components of the image sensor represented by the information stored in the storage part; and a notification part sending a notification based on a result of comparison of the comparison part.

Further, another aspect of the disclosure provides a module configuration notification method for an image sensor, which includes an imaging system configured by combining a plurality of modularized components and a processing part executing a process using an image acquired by the imaging system and further includes a storage part storing information representing a combination of the components of the image sensor and data to be used when the image sensor including the components indicated by the combination executes the process, wherein each of the components includes a non-volatile memory storing information for specifying the component. The module configuration notification method includes: collecting the information for specifying the component stored in the memory of each of the components and the information representing the combination of the components of the image sensor from the image sensor through a collection part of a computer; comparing a combination of the components stored in the memory of each of the components and the combination of the components of the image sensor represented by the information stored in the storage part based on the information collected by the collection part through a comparison part of the computer; and sending a notification based on a result of comparison of the comparison part through a notification part of the computer.

DESCRIPTION OF THE EMBODIMENTS

Figure 1:
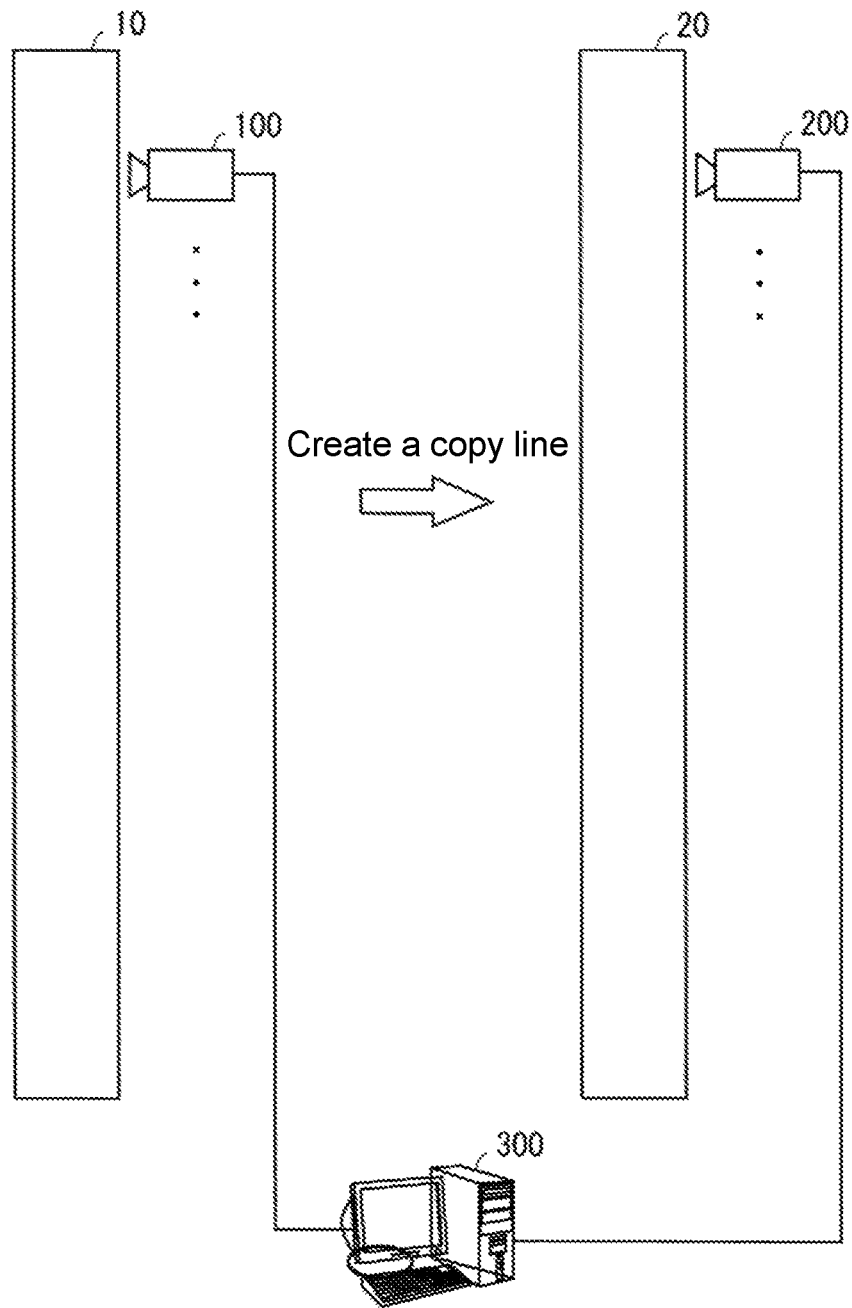
FIG. 1 is a diagram schematically showing an example of copying a production line using an image sensor.

The first aspect of the disclosure provides an image sensor, including: an imaging system configured by combining a plurality of modularized components; and a processing part executing a process using an image acquired by the imaging system, wherein each of the components includes a non-volatile memory storing information for specifying the component, and the image sensor further includes: a collection part collecting the information for specifying the component from the memory of each of the components; a storage part storing information representing a combination of the components of the image sensor and data to be used when the image sensor including the components indicated by the combination executes the process; a comparison part comparing a combination of its components specified by the information collected by the collection part with the combination of the components of the image sensor represented by the information stored in the storage part; and a notification part sending a notification based on a result of comparison of the comparison part.

According to the above, in the image sensor having the modularized components, the user can be notified of the result of comparison between the combination of the components for executing processing using the data stored in the image sensor and the current combination of the components, and therefore it can be expected that the problem that occurs due to the difference of components of the image sensors during execution of the processing will be reduced. Further, for example, when a copy line of a production line using a modular image sensor is newly established, it is possible to make the configuration of the copy destination image sensor match the copy source image sensor based on the notification related to the comparison result of the configurations of the copy destination image sensor and the copy source image sensor before the copy line is put into operation. Therefore, it can be expected that the above-mentioned problem is unlikely to happen after operation of the copy line.

When the result of comparison indicates that the combination of its components specified by the information collected by the collection part does not match the combination of the components of the image sensor represented by the information stored in the storage part, the notification part may send a notification that the combinations of the components do not match. In addition, the image sensor may further include an operation setting part setting an operation related to the notification of the notification part when the combination of the components specified by the information collected by the collection part does not match the combination of the components of the image sensor represented by the information stored in the storage part. Here, the operation setting part may set the operation for each timing of the process executed by the image sensor. Further, the operation setting part may set an output method of the notification of the notification part as the operation. In addition, the operation setting part may set a use method of the data of the processing part as the operation. The image sensor may further include a data setting part setting the data to be used when the image sensor executes the process based on the result of comparison of the comparison part. Besides, when the result of comparison of the comparison part indicates that the combination of its components specified by the information collected by the collection part matches the combination of the components of the image sensor represented by the information stored in the storage part, the data setting part may set the data as data to be used for the process of the processing part.

For example, in the case of performing adjustment work to make each component of the copy destination image sensor match each component of the copy source image sensor, if the notification part sends a notification every time the components of the image sensor change, unnecessary work man-hours such as confirmation of the notification may occur. According to the above configuration, however, by ignoring the notification through control over the notification of the notification part, it is possible to customize the operation of the notification part so that a notification is sent only when the user considers it necessary.

The components may include an illumination part for illuminating a subject, a lens part for forming an optical image of the subject, and an imaging part for generating the image based on the optical image. By changing the combination of the illumination part, the lens part, and the imaging part, it is possible to construct imaging systems of various specifications.

In addition, the information stored in the storage part may be information representing a combination of a plurality of components included in another image sensor and the data stored in the storage part may be data to be used when the another image sensor executes a process.

Further, another aspect of the disclosure provides a module configuration notification method for an image sensor, which includes an imaging system configured by combining a plurality of modularized components and a processing part executing a process using an image acquired by the imaging system and further includes a storage part storing information representing a combination of the components of the image sensor and data to be used when the image sensor including the components indicated by the combination executes the process, wherein each of the components includes a non-volatile memory storing information for specifying the component. The module configuration notification method includes: collecting the information for specifying the component stored in the memory of each of the components and the information representing the combination of the components of the image sensor from the image sensor through a collection part of a computer; comparing a combination of the components stored in the memory of each of the components and the combination of the components of the image sensor represented by the information stored in the storage part based on the information collected by the collection part through a comparison part of the computer; and sending a notification based on a result of comparison of the comparison part through a notification part of the computer.

Effects

The disclosure can provide a technique that, when an image sensor copying the module configuration of a modular image sensor is introduced, prevents inappropriate data from being applied to the copy destination modular image sensor.

Hereinafter, an image sensor according to an embodiment of the disclosure will be described with reference to the drawings. Nevertheless, the embodiment described below shows an example of the image sensor and is not limited to the configuration described below.

<Application Example>

First, an example of the scene to which the disclosure is applied will be described. In the embodiment exemplified below, it is assumed that a copy line, which is a copy of a production line using a modular image sensor, is newly established. As shown in FIG. 1, in the present embodiment, a modular image sensor 100 that is being used in a production line 10, for example, is copied to an image sensor 200 of a production line 20, which serves as the copy destination of the production line 10. Nevertheless, the number of the image sensors to be copied is not necessarily one. Here, the copying of the image sensor is, for example, to make the modules attached to the copy source image sensor and the data used for the processing of the image sensor match the modules attached to the copy destination image sensor and the data used for the processing of the image sensor in order to execute the same inspection as that executed by the copy source image sensor on the copy destination image sensor. The objects to be matched in the copying are not limited to the modules and the data used for the processing of the image sensor, and may also be other elements of the image sensor.

In the present embodiment, the image sensors 100 and 200 are connected to a management computer 300 via a FA (Factory Automation) network such as EtherCAT. The user operates the management computer 300 to transmit and receive various data, including the module configuration data and the scene data described below, with the image sensors 100 and 200.

The image sensor 100 of the present embodiment is a processing-integrated image sensor having a so-called modular structure. As shown in the example of FIG. 2, an illumination part 101, a lens part 102, and an imaging part 103, which are components of an imaging system, are modularized respectively and the user can combine the respective modules as desired according to the purposes, etc. of the image sensor 100. Non-volatile memories 107, 108, and 109 are respectively provided in the modules (the illumination part 101, the lens part 102, and the imaging part 103). The factory default format information, individual information, etc. are stored in the memories 107, 108, and 109. In addition, the user can write any information (user data) to the memories 107, 108, and 109. A processing part 104 (see FIG. 3) of a sensor body 106 can perform information reading and/or writing on the memories 107, 108, and 109 of the modules.

As described above, by providing a non-volatile memory in each module and storing the specific information related to the module therein for reference, the combination of the modules that constitute the image sensor 100 can be easily checked by the image sensor 100 (the processing part 104) itself or an external computer, etc., for example. Therefore, it is possible to facilitate management of the image sensor having the modular structure.

In the present embodiment, when a copy line of the production line that is under inspection of the image sensor is newly established using such image sensor management, it is possible to notify the user of an error if the modules attached to the copy source image sensor do not match the modules attached to the copy destination image sensor.

<Configuration of the Image Sensor>

Figure 2A:
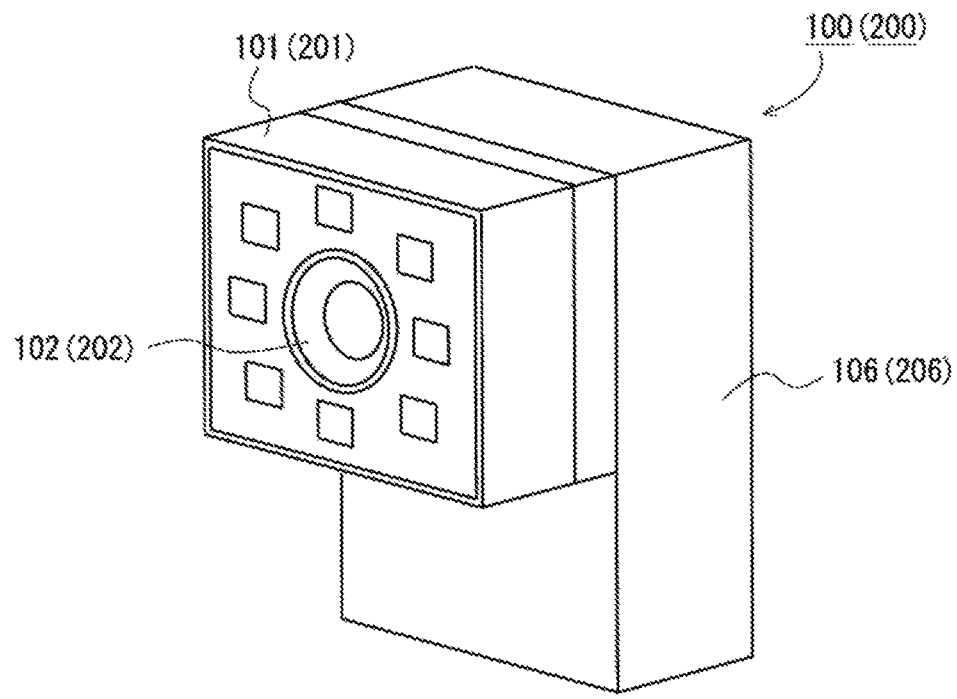
FIG. 2A is a perspective view schematically showing the appearance of the image sensor.
Figure 2B:
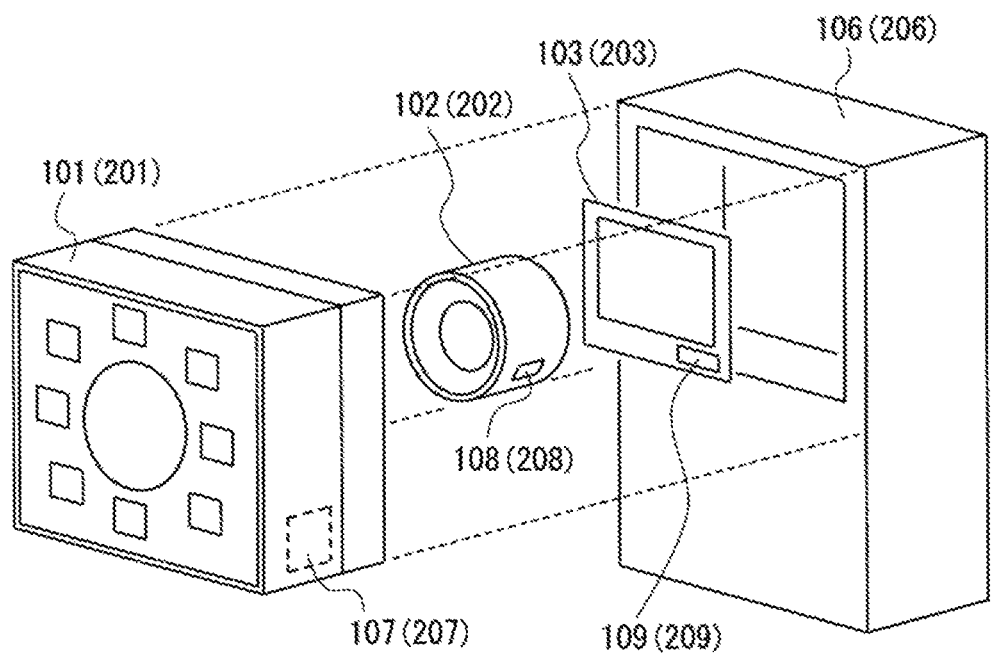
FIG. 2B is a perspective view schematically showing a state where the image sensor is disassembled.
Figure 3:
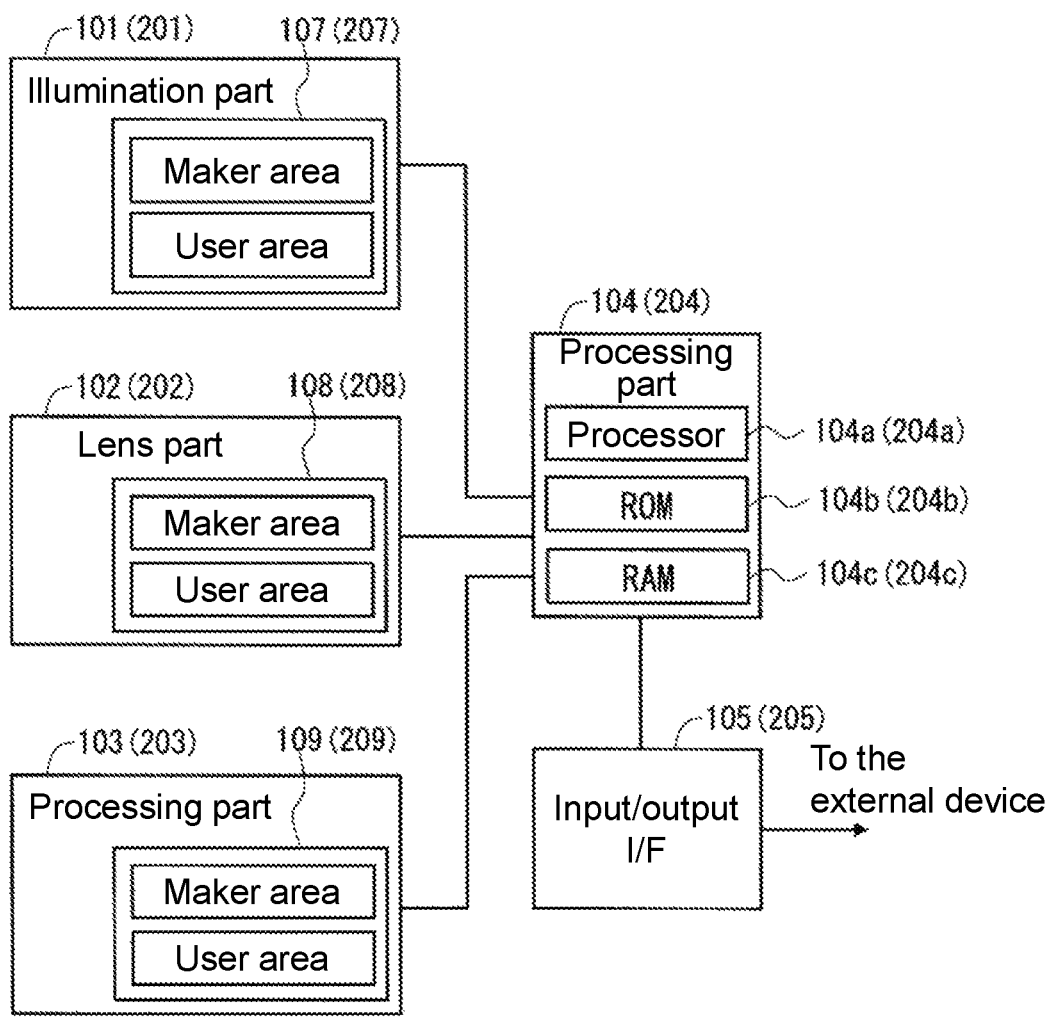
FIG. 3 is a block diagram schematically showing the configuration of the image sensor.
Figure 4:
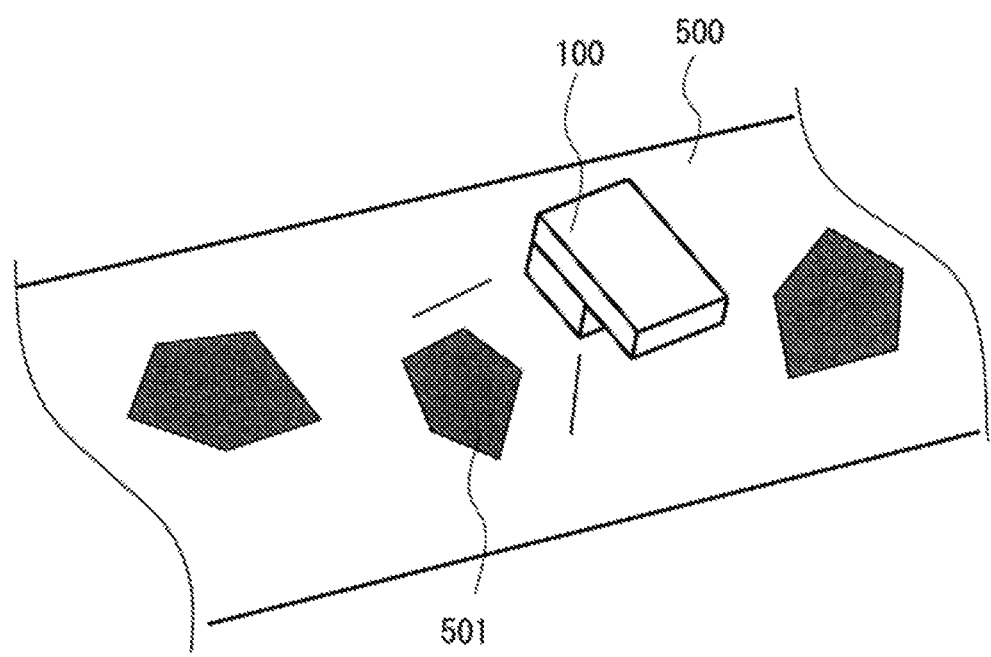
FIG. 4 is a view showing an example of use of the image sensor.

The image sensor according to an embodiment of the disclosure will be described with reference to FIG. 2A, FIG. 2B, FIG. 3, and FIG. 4. FIG. 2A is a perspective view schematically showing the appearance of the image sensor 100, 200 and FIG. 2B is a perspective view schematically showing a state where the image sensor 100, 200 is disassembled. FIG. 3 is a block diagram schematically showing the configuration of the image sensor 100, 200. FIG. 4 is a view showing an example of use of the image sensor 100, 200.

The image sensor 100, 200 is a device installed in a production line of a factory, for example, and used for various processes using images. The image sensor 100, 200 is also called a vision sensor or a vision system. The image sensor 100, 200 of the present embodiment is a processing-integrated image sensor (the so-called smart camera) formed by integrating an imaging system and a processing system.

The image sensor 100, 200 includes the illumination part 101, 201, the lens part 102, 202, and the imaging part 103, 203 as the imaging system. The illumination part 101, 201 is a device for illuminating a subject (an object to be inspected, etc.) within a field of view of the image sensor 100, 200 and is composed of a plurality of light emitting elements (LEDs (Light-Emitting Diode), etc.) arranged around the lens part 102, 202, for example. The lens part 102, 202 is an optical system for forming an optical image of the subject on the imaging part 103, 203. For example, an optical system having functions such as focus adjustment, aperture, zoom, etc. is used. The imaging part 103, 203 is a device for generating and outputting image data through photoelectric conversion and is composed of imaging elements such as CCD (Charge-Coupled Device) and CMOS (Complementary Metal Oxide Semiconductor), for example.

The image sensor 100, 200 further includes the processing part 104, 204 and an input/output I/F 105, 205 as the processing system. The processing part 104, 204 is a device for performing image processing (for example, preprocessing, feature amount extraction, etc.) on the image data taken from the imaging system, various processes based on the result of the image processing (for example, inspection, character recognition, individual identification, etc.), data transmission/reception with an external device via the input/output I/F 105, 205, generation of data to be outputted to the external device, processing of data received from the external device, control of the imaging system and the input/output I/F 105, 205, etc.

The processing part 104, 204 is composed of a processor 104a, 204a, a ROM (Read-Only Memory) 104b, 204b, a RAM (Random Access Memory) 104c, 204c, etc., respectively, and the processor 104a, 204a develops the programs stored in the ROM 104b, 204b to the RAM 104c, 204c and executes them, so as to realize the various processes described above and the processes described below. A part or all of the functions of the processing part 104, 204 may be realized by an ASIC (Application Specific Integrated Circuit), an FPGA (Field-Programmable Gate Array), etc. or may be provided by an external device. The input/output I/F 105, 205 is a communication interface for transmitting/receiving data to/from the external device. For example, the input/output I/F 105, 205 includes a network interface for connecting to a PLC (Programmable Logic Controller) or a management terminal (computer), a parallel interface for connecting to another sensor or controller, etc.

The image sensor 100, 200 of the present embodiment has a modular structure in which, as shown in FIG. 2B, the three modules, i.e., the illumination part 101, 201, the lens part 102, 202, and the imaging part 103, 203, are selected and attached to the sensor body 106, 206. Regarding the illumination part, it is also possible to use it without selecting it. Each of the modules is fixed to the sensor body 106, 206 by screw fastening, for example, and the user can attach/detach the module freely.

Multiple types of modules are prepared to serve as the illumination part (illumination module) 101, 201, such as modules with illumination lights of different wavelengths like white illumination/red illumination/infrared light illumination, and modules with different light emitting element arrangements, light quantities, or light emitting patterns. Further, multiple types of light sources (LEDs, etc.) such as red, blue, green, and infrared light sources are provided in one module, and an illumination module that is capable of irradiating lights of wavelengths (for example, white, violet, pink, etc.) other than red, blue, green, and infrared through control of light emission of each light source may also be used. This type of illumination is called multi-color illumination, etc. Multiple types of modules are prepared to serve as the lens part (lens module) 102, 202, such as a module having a function of adjusting the focus manually or automatically with use of an actuator, etc., a module with different fields of view such as a narrow field of view/a wide field of view, and a module having a zoom function. Multiple types of modules are prepared to serve as the imaging part 103, 203, such as modules having different numbers of pixels, frame rates, shutter types (rolling shutter/global shutter), and color/monochrome elements. The user can combine proper modules as appropriate according to the purpose or the required specification of the image sensor 100, 200.

A non-volatile memory is incorporated in each module. Specifically, as shown in FIG. 3, an illumination module memory 107, 207 is incorporated in the illumination part 101, 201, a lens module memory 108, 208 is incorporated in the lens part 102, 202, and an imaging module memory 109, 209 is incorporated in the imaging part 103, 203. Hereinafter, these are collectively referred to as "module memory". For example, EPROM (Erasable Programmable Read-Only Memory), EEPROM (Electrically Erasable Programmable Read-Only Memory), FeRAM (Ferroelectric Random Access Memory), MRAM (Magnetoresistive Random Access Memory), etc. can be used as the module memory, and the module memory may have any data capacity. In the present embodiment, an EEPROM having a capacity of several kilobytes to several tens of megabytes is used as an example.

In the module memory, two writing areas, i.e., "maker area" and "user area", are provided. The maker area is an area for the maker to write module default data. The user can read the data in the maker area but cannot rewrite or delete the data in the maker area. For example, format information (format name, format number, etc.) and individual information (serial number, lot number, hardware version, etc.) of the module are stored in the maker area. In addition, setting values and correction parameters during driving of the module, and individual variation information of the module (for example, data measured by factory shipment inspection) may be stored in the module memory. For example, in the case of the illumination part, the illumination control setting values (control type, voltage, Duty, delay, block lighting method, etc.), variation in brightness and color tone of each light source, optical axis information, etc. may be stored. In the case of the lens part, lens/focus setting values (focus initial reference value, etc.), presence/absence of AF function, focal length, angle of view, F value, distortion amount, optical axis information, etc. may be stored. Further, in the case of the imaging part, camera setting values (setting initial value of the imaging element, etc.), pixel defect correction, vertical stripe correction data, white balance initial value, etc. may be stored. In contrast, the user area is an area that the user can rewrite. The user can freely use the user area. For example, any information may be stored therein, such as the information that specifies the location (factory, production line) where the image sensor is installed, information on the purchase date and maintenance date of the module, status of use of the module, etc. Nevertheless, the above is merely an example, and any data that is useful information for management and operation of the image sensor 100, 200 may be stored in module memory.

The image sensor 100, 200 can be used for various purposes. For example, the image sensor 1 can be used for recording the image of the object under inspection, recognizing the shape, detecting the edge, measuring the width and the number, measuring the area, acquiring color features, labeling and segmentation, object recognition, reading bar codes and two-dimensional codes, OCR, individual identification, etc. FIG. 4 shows an example of imaging a product 501 flowing on a conveyor 500 of the production line 10 with the image sensor 100 and inspecting the appearance of the product 501.

<Example of Notification of an Error in the Module Configuration of the Image Sensor>

Figure 5:
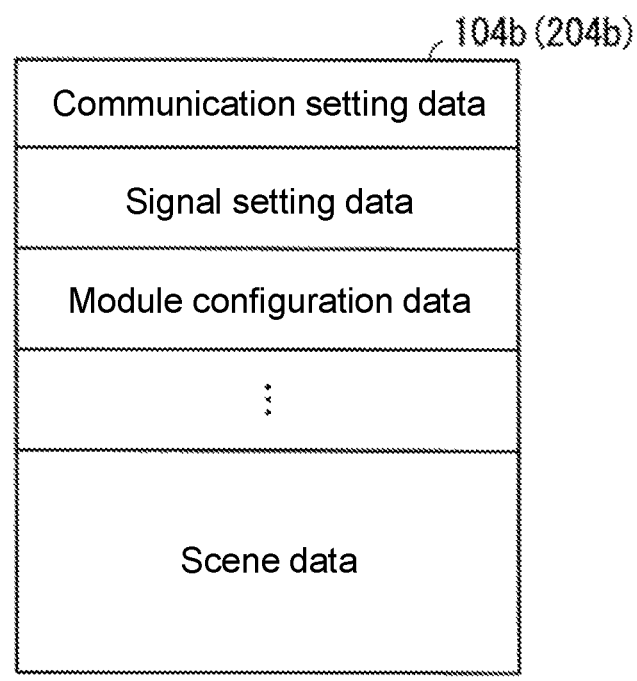
FIG. 5 is a diagram showing an example of the storage area of the ROM of the image sensor.

First, the storage areas of the ROM 104b, 204b of the image sensor 100, 200 in the present embodiment will be described with reference to FIG. 5. Communication setting data related to various communication settings such as IP addresses to be used when the image sensor 100, 200 communicates with other devices, etc. in the production line 10, 20 is stored in the ROM 104b, 204b. In addition, signal setting data related to information to be transmitted by various signal lines of the image sensor 100, 200 is stored in the ROM 104*b*, 204*b*. Data related to format information such as the model number of each module attached to the image sensor 100, 200 is stored in the ROM 104*b*, 204*b*. Further, data (scene data) to be used for executing inspection, such as inspection programs executed in the image sensor 100, 200 and various parameters used in the inspection programs, is stored in the ROM 104*b*, 204*b*. Nevertheless, the ROM 204*b* is an example of the storage part that stores information representing a combination of the components of the image sensor and data used when the image sensor executes processing.

In the present embodiment, since the image sensor 100 has been operated in the production line 10, the module configuration data and the scene data are stored in the ROM 104*b*. On the other hand, in the production line 20 which is the copy destination for the production line 10, the image sensor 200 has not been operated yet and the module configuration data and the scene data are not stored in the ROM 204*b* of the image sensor 200. Thus, the image sensor 200 acquires the module configuration data and the scene data stored in the image sensor 100 and stores the acquired module configuration data and scene data in the ROM 204*b*. The module configuration data stored in the image sensor 100 is an example of the information representing a combination of multiple components included in another image sensor, and the scene data stored in the image sensor 100 is an example of the data that is used when the image sensor executes processing.

Figure 6:
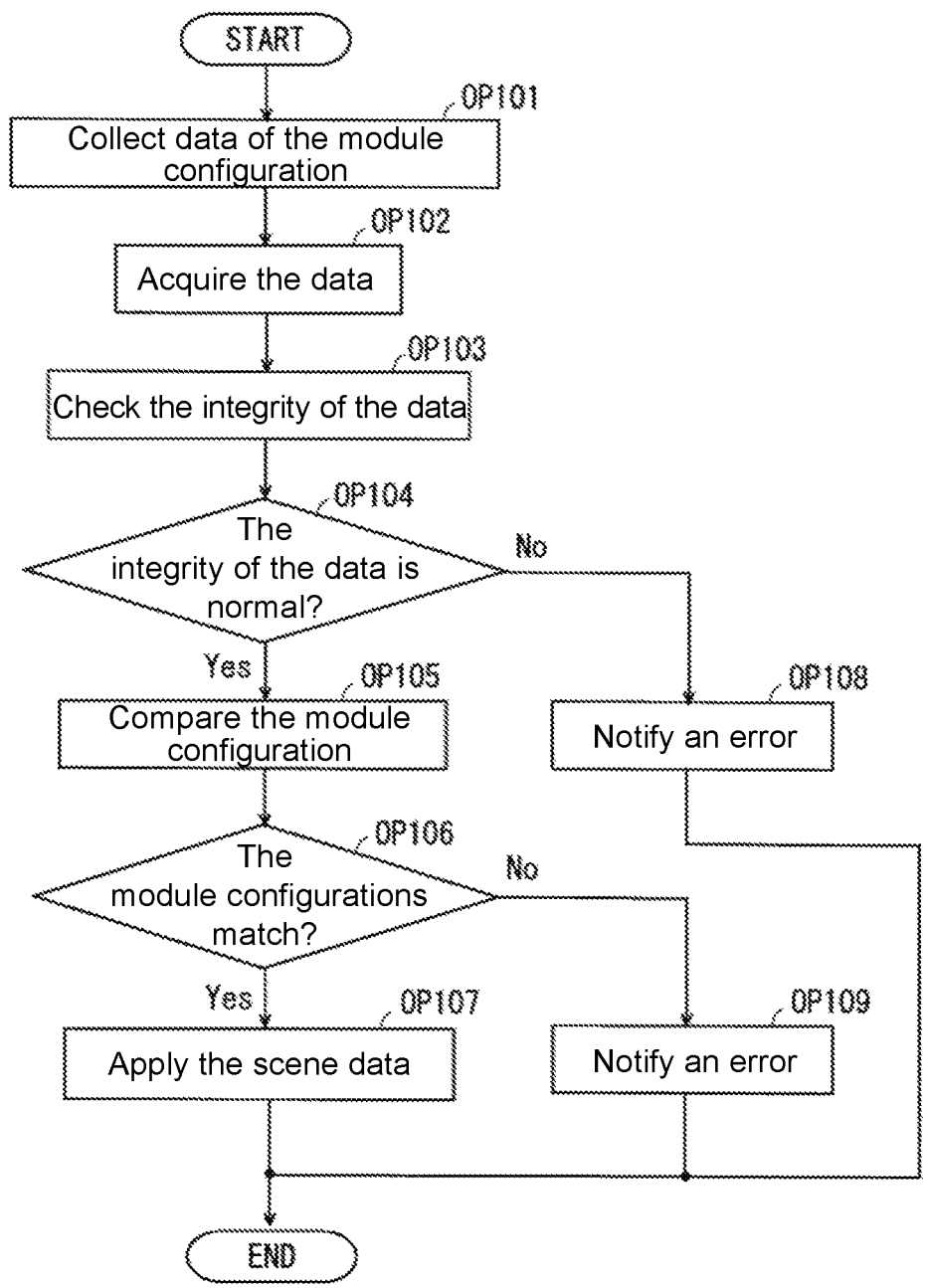
FIG. 6 is a flowchart showing an example of the processing executed by the processing part of the image sensor.

Next, the processing executed by the processing part 204 of the image sensor 200 will be described with reference to the flowchart shown in FIG. 6. As an example, the processing part 204 of the image sensor 200 starts the processing of the flowchart shown in FIG. 6 when the image sensor 200 is powered on.

In OP101, the processing part 204 functions as a collection part and collects module-related data from the module memory of each module of the image sensor 200. The module-related data of each module is an example of the information for specifying the component. For example, the processing part 204 collects data indicating the format information, the serial number, the lot number, and the hardware version of the module stored in the maker area of the module memory as the module-related data. In addition, the processing part 204 gathers and temporarily stores the module-related data collected from each module in the RAM 204*c* as the module configuration data. Next, the processing part 204 advances the processing to OP102.

In OP102, the processing part 204 acquires the module configuration data and the scene data stored in the ROM 104*b* of the image sensor 100. The processing part 204 may acquire the data through communication with the image sensor 100, or the management computer 300 may acquire the data from the image sensor 100 or the processing part 204 may acquire the data from the management computer 300. When the module configuration data and the scene data of the image sensor 100 are acquired, the processing part 204 stores the acquired data in the ROM 204*b*. Next, the processing part 204 advances the processing to OP103.

In OP103, the processing part 204 checks the integrity, such as whether the data acquired in OP102 is data indicating the module configuration for the image sensor 200, whether the data is scene data executable by the image sensor 200, and whether the data is applicable to the image sensor 200. Next, the processing part 204 advances the processing to OP104.

In OP104, the processing part 204 determines whether the data is applicable to the image sensor 200 based on the checking in OP103. If the data is applicable to the image sensor 200, that is, if the integrity of the data is normal (OP104: Yes), the processing part 204 advances the processing to OP105. On the other hand, if the data is not applicable to the image sensor 200, that is, if there is an abnormality in the integrity of the data (OP104: No), the processing part 204 advances the processing to OP108.

In OP105, the processing part 204 functions as a comparison part and compares the information of the module configuration (for example, the format information of each module) indicated by the module configuration data of the image sensor 200 collected in OP101, with the information of the module configuration indicated by the module configuration data of the image sensor 100 acquired in OP102. Next, the processing part 204 advances the processing to OP106.

In OP106, the processing part 204 determines whether the module configurations of the image sensor 100 and the image sensor 200 match each other based on the comparison in OP105. If the module configurations match (OP106: Yes), the processing part 204 advances the processing to OP107. On the other hand, if the module configurations do not match (OP106: No), the processing part 204 advances the processing to OP109.

In OP107, as a result of the determination in OP106, the modules attached to the image sensor 100 match the modules attached to the image sensor 200. Therefore, the processing part 204 applies the scene data acquired in OP102 to the image sensor 200. Here, "applying the scene data" for example means that the processing part 204 develops the scene data acquired in OP102 in the RAM 204*c* and functions as a data setting part to perform setting of the scene data. For example, the processing part 204 performs setting for executing the inspection executed in the image sensor 100 with the image sensor 200 using the scene data. The setting may include setting for each module attached to the image sensor 200. When the processing part 204 completes the processing of OP107, the processing of this flowchart ends.

In OP108, the processing part 204 notifies the management computer 300 of an error indicating that the data acquired in OP102 cannot be applied to the image sensor 200. When receiving the notification from the image sensor 200, the management computer 300 displays a message, etc. on the monitor of the management computer 300 to notify the user of the error. When the notification is sent, the processing part 204 ends the processing of this flowchart.

Further, in OP109, the processing part 204 functions as a notification part and notifies the management computer 300 of an error indicating that the configuration of each module of the image sensor 100 and the configuration of each module of the image sensor 200 are different. The notification may include information indicating the module that has different configuration or configuration information of each module. When receiving the notification from the image sensor 200, the management computer 300 displays a message, etc. on the monitor of the management computer 300 to notify the user of the error. When the notification is sent, the processing part 204 ends the processing of this flowchart.

As described above, according to the present embodiment, when each module constituting the modular image sensor is copied to configure a new image sensor, by making each module of the copy destination image sensor match each module of the copy source image sensor, it is possible to use the copy destination image sensor. In the above example, when newly establishing the copy line of the production line that uses a modular image sensor, the user can know whether there is a difference in the configuration of each module between the copy source image sensor and the copy destination image sensor before putting the copy line into operation. As a result, it is possible to put the copy line into operation with the modules of the image sensor that is to be used in the copy line matching the modules that are being used in the copy source image sensor. Therefore, the conventional problem that the inspection cannot be performed normally until the user notices the defect of the image sensor in the copy line is unlikely to happen.

In the present embodiment, an error is displayed when there is a difference in the module configuration between the copy source image sensor and the copy destination image sensor through the processing of OP106 and OP109. However, for example, if the above error is displayed every time the modules of the copy destination image sensor are adjusted, it may hinder the efficiency of the adjustment work. Moreover, in the case where the processing for setting of the image sensor at the time when an error is displayed is fixed (for example, the setting included in the scene data is initialized or the setting screen is displayed on the monitor of the management computer 300, etc.), unnecessary initialization or setting work may occur. Thus, in the present embodiment, for example, the user can operate the management computer 300 to perform notification setting for each error that occurs in the above processing.

Figure 7:
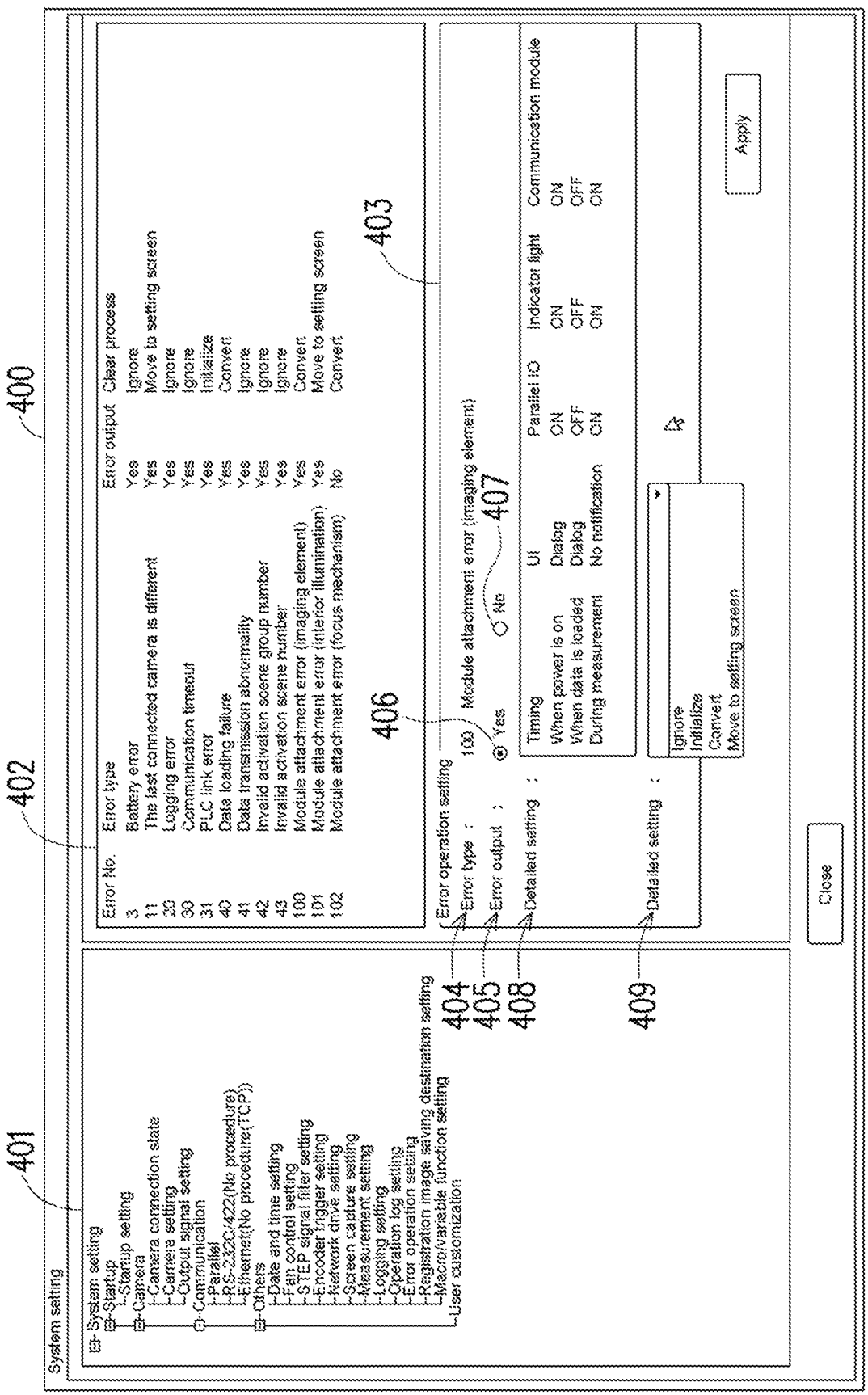
FIG. 7 is a diagram showing an example of the screen for performing operation setting of an error notified by the processing part of the image sensor.

FIG. 7 shows an example of a setting screen 400 for performing setting related to the processing of the error notification described above. The screen is displayed on the monitor of the management computer 300. The setting screen 400 has a display area 401 of a setting list in which a list of various settings of the image sensor 100, 200 is displayed; a display area 402 of an error list in which errors notified in each setting in the setting list are displayed; and a display area 403 of an error operation setting in which setting contents of error operations, such as display and processing when each error in the error list occurs, are displayed.

In the present embodiment, the user selects "error operation setting" from the setting list. When the user selects "error operation setting" from the setting list, an error that the user can set the error operation is displayed in the error list display area 402. In the example of FIG. 7, the user selects the error of "module attachment error (imaging element)" with the error number "100". As a result, the setting content of the error operation of the error is displayed in the error operation setting display area 403.

In the example of FIG. 7, in the error operation setting display area 403, the name of the error is displayed in the "error type" column 404. Further, when an error displayed in the "error type" column 404 occurs in the above error notification processing, a setting as to whether to send a notification from the image sensor 200 to the external device such as the management computer 300 or a notification by lighting an error notification LED (not shown) of the image sensor 200 is displayed in the "error output" column 405. In the case of the example of FIG. 7, the user selects the "Yes" radio button 406 to validate the notification to the management computer 300 when an error occurs, and selects the "No" radio button 407 to invalidate the notification to the management computer 300 when an error occurs.

As shown in FIG. 7, when the user selects the "Yes" radio button 406 in the "error output" column 405, the setting content of the error operation is displayed in the "detailed setting" column 408. In the example of FIG. 7, the items, "timing", "UI", "parallel IO", "indicator light", and "communication module", are displayed in the "detailed setting" column 408.

In the item "timing", the timing of notification of the error displayed in the "error type" column 404 is displayed. For example, the timings for the image sensor 200 to execute the processing may be when the image sensor 200 is powered on ("when power is on" in the drawing), when the scene data is read into the RAM 204c in the image sensor 200 ("when data is loaded" in the drawing), and when the inspection program is executed in the image sensor 200 to perform the inspection ("during measurement" in the drawing). Besides, the timing when the scene data is acquired from the ROM 204b, the timing when the scene data is acquired from the external device of the image sensor 200, etc. may also be displayed in the item "timing" as individual timings. Thus, it is possible to flexibly set the presence or absence of error notification according to the route of acquisition of the scene data in the image sensor 200.

An error display format showing how the error is displayed for each timing of the error notification displayed in the item "timing" is displayed in the item "UI". For example, the settings that can be selected in the item "UI" may be "dialog", "color display", and "no notification".

The setting of "dialog" is a setting for displaying a dialog box notifying that an error has occurred on the monitor of the management computer 300 when the error occurs, and it is a notification method that requests a certain operation from the user, such as closing the dialog box, in order to continue the processing of the image sensor 200 when the error occurs. Further, the setting of "color display" is a setting for displaying in color a message, etc. notifying that an error has occurred on the monitor of the management computer 300 when the error occurs, and it is a notification method that notifies the user of the error when the error occurs but continues the processing of the image sensor 200. For example, the target error may be highlighted in a log, etc. in which an error occurrence history is stored, and a text message may be displayed on the monitor of the management computer 300. In addition, the setting of "no notification" is a notification method that continues the processing of the image sensor 200 without notifying the user of the error when the error occurs.

A setting ("ON" or "OFF" in the drawing) as to whether to output an error signal of the error displayed in the "error type" column 404 from a signal line of the image sensor 200 is displayed in the item "parallel JO". A setting ("ON" or "OFF" in the drawing) as to whether to light the error notification LED (not shown) of the image sensor 200 when the error displayed in the "error type" column 404 occurs is displayed in the item "indicator light". A setting ("ON" or "OFF" in the drawing) as to whether to output an error bit from the image sensor 200 to the FA network when the error displayed in the "error type" column 404 occurs is displayed in the item "communication module".

For example, each setting that can be selected in each of the items "UI", "parallel IO", "indicator light", and "communication module" is displayed in a drop-down list. By selecting the desired setting for each item from the drop-down list for each timing displayed in the item "timing", the user sets various output methods for the error displayed in the "error type" column 404.

Furthermore, a "clear process" column 409 for setting the processing to be executed by the image sensor 200 and/or the management computer 300 when the error displayed in the "error type" column 404 occurs is provided in the error operation setting display area 403. In the example of FIG. 7, the user can select four use methods of the scene data, which are "ignore", "initialize", "convert", and "move to setting screen", from the drop-down list in the "clear process" column 409.

Here, "ignore" is a use method of the scene data for diverting the entire current setting (parameters, etc.) which is the cause of the error displayed in the "error type" column 404. "Initialize" is a use method of the scene data for initializing the current setting which is the cause of the error displayed in the "error type" column 404. "Convert" is a use method of the scene data for diverting a usable portion out of the current setting which is the cause of the error displayed in the "error type" column 404, and initializing the unusable portion. The user can operate the management computer 300, etc. to separately set which portion of the setting is to be diverted and which portion is to be initialized for each error. "Move to setting screen" is a use method of the scene data for displaying on the monitor of the management computer 300 a setting screen for designating the processing to be executed when the error displayed in the "error type" column 404 occurs. In this case, every time an error occurs, the user can designate the appropriate processing for the error in the displayed setting screen for execution.

Thus, the user can operate the management computer 300 to set the error operation for each error notified in OP101 to OP109 described above. Therefore, when adjusting the module configuration of the image sensor 200 in the production line 20 which is the copy destination of the production line 10, the processing part 204 of the image sensor 200 functions as the operation setting part and performs various settings of the error operation set by the above setting screen 400, by which customized error notification can be carried out in the above OP101 to OP109. For example, the user will be notified of an error that is considered necessary and will not be notified of an error that is considered unnecessary. As a result, it can be expected to reduce the work man-hours that are required in the past due to unnecessary error notification.

<Others>

Nevertheless, the above embodiment merely exemplifies a configuration example of the disclosure. The disclosure is not limited to the specific forms described above, and it is possible to make various modifications within the scope of the technical idea of the disclosure. For example, the image sensor 100, 200 is configured by integrating the processing system and the imaging system as described above. However, the image sensor 100, 200 may also be configured with separate processing system and imaging system, which are connected by a wired cable, etc. In addition, although the above embodiment illustrates an example that the three modules are the illumination part, the lens part, and the imaging part, the components to be attached to the image sensor are not limited thereto. For example, an optical filter, the input/output I/F, the processing part (processor or memory), the display, etc. may also be modularized. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

In addition, the management computer 300 may function as the collection part, the comparison part, and the notification part respectively and execute the processing of the above flowchart. For example, the management computer 300 collects module configuration data or scene data stored in each ROM 104b, 204b and information related to each attached module from the image sensor 100, 200 connected to the management computer 300, and compares the module configurations based on the collected information. Then, as a result of the comparison, the management computer 300 may notify the user of the error regarding the image sensor with inconsistent module configuration via the monitor of the management computer 300, or instruct to apply the scene data to the image sensor with consistent module configuration. According to this, since the module configurations of multiple image sensors can be checked collectively by the management computer 300, it is easier to manage the module configurations of the image sensors.

<Computer-Readable Recording Medium>

Programs for realizing management tools, OSs, etc. which are for setting the above management computer, image sensor, etc. on computers and other devices and apparatuses (hereinafter, computer, etc.) can be recorded in a recording medium that can be read by the computer, etc. Then, by enabling the computer, etc. to read and execute the programs in the recording medium, the functions thereof can be provided.

Here, the recording medium that can be read by the computer, etc. refers to a recording medium that can accumulate information such as data and programs by electrical, magnetic, optical, mechanical, or chemical action and can be read from the computer, etc. Among such recording media, those that are removable from the computer, etc. may include a flexible disk, a magneto-optical disk, a CD-ROM, a CD-R/W, a DVD, a Blu-ray disk, a DAT, an 8 mm tape, a memory card such as flash memory, etc. Further, recording media that are fixed to the computer, etc. may include a hard disk, a ROM, etc.

APPENDIX

An image sensor (200), comprising:
an imaging system (201, 202, 203) configured by combining a plurality of modularized components; and
a processing part (204) executing a process using an image acquired by the imaging system (201, 202, 203), wherein
each of the components comprises a non-volatile memory (207, 208, 209) storing information for specifying the component, and
the image sensor (200) further comprises:
a collection part (204) collecting the information for specifying the component from the memory (207, 208, 209) of each of the components;
a storage part (204b) storing information representing a combination of the components of the image sensor and data to be used when the image sensor comprising the components indicated by the combination executes the process;
a comparison part (204) comparing a combination of its components specified by the information collected by the collection part (204) with the combination of the components of the image sensor represented by the information stored in the storage part (204b); and
a notification part (204) sending a notification based on a result of comparison of the comparison part (204).

What is claimed is:
1. An image sensor, comprising:
an imaging system configured by combining a plurality of modularized components; and
a processing part executing a process using an image acquired by the imaging system, wherein each of the components comprises a non-volatile memory storing information for specifying the component, and the image sensor further comprises:
a collection part collecting the information for specifying the component from the memory of each of the components;
a storage part storing information representing a combination of the components of the image sensor and data to be used when the image sensor comprising the components indicated by the combination executes the process;
a comparison part comparing a combination of its components specified by the information collected by the collection part with the combination of the components of the image sensor represented by the information stored in the storage part; and
a notification part sending a notification based on a result of comparison of the comparison part,
wherein when the result of comparison indicates that the combination of its components specified by the information collected by the collection part does not match the combination of the components of the image sensor represented by the information stored in the storage part, the notification part sends a notification that the combinations of the components do not match,
wherein the image sensor further comprises an operation setting part setting an operation related to the notification of the notification part when the combination of the components specified by the information collected by the collection part does not match the combination of the components of the image sensor represented by the information stored in the storage part, and
the notification part operates according to the operation set by the operation setting part.

2. The image sensor according to claim 1, wherein the operation setting part sets the operation for each timing of the process executed by the image sensor.

3. The image sensor according to claim 2, wherein the operation setting part sets an output method of the notification of the notification part as the operation.

4. The image sensor according to claim 2, wherein the operation setting part sets a use method of the data of the processing part as the operation.

5. The image sensor according to claim 2, wherein the image sensor further comprises a data setting part setting the data to be used when the image sensor executes the process based on the result of comparison of the comparison part.

6. The image sensor according to claim 5, wherein when the result of comparison of the comparison part indicates that the combination of its components specified by the information collected by the collection part matches the combination of the components of the image sensor represented by the information stored in the storage part, the data setting part sets the data as data to be used for the process of the processing part.

7. The image sensor according to claim 1, wherein the operation setting part sets an output method of the notification of the notification part as the operation.

8. The image sensor according to claim 1, wherein the operation setting part sets a use method of the data of the processing part as the operation.

9. The image sensor according to claim 1, wherein the image sensor further comprises a data setting part setting the data to be used when the image sensor executes the process based on the result of comparison of the comparison part.

10. The image sensor according to claim 9, wherein when the result of comparison of the comparison part indicates that the combination of its components specified by the information collected by the collection part matches the combination of the components of the image sensor represented by the information stored in the storage part, the data setting part sets the data as data to be used for the process of the processing part.

11. The image sensor according to claim 1, wherein the components comprise an illumination part for illuminating a subject, a lens part for forming an optical image of the subject, and an imaging part for generating the image based on the optical image.

12. An image sensor, comprising:
an imaging system configured by combining a plurality of modularized components; and
a processing part executing a process using an image acquired by the imaging system, wherein each of the components comprises a non-volatile memory storing information for specifying the component, and the image sensor further comprises:
a collection part collecting the information for specifying the component from the memory of each of the components;
a storage part storing information representing a combination of the components of the image sensor and data to be used when the image sensor comprising the components indicated by the combination executes the process;
a comparison part comparing a combination of its components specified by the information collected by the collection part with the combination of the components of the image sensor represented by the information stored in the storage part; and
a notification part sending a notification based on a result of comparison of the comparison part, wherein the information stored in the storage part is information representing a combination of a plurality of components included in another image sensor, and the data stored in the storage part is data to be used when the another image sensor executes a process.

13. A module configuration notification method for an image sensor,
wherein the image sensor comprises an imaging system configured by combining a plurality of modularized components and a processing part executing a process using an image acquired by the imaging system, and the image sensor further comprises a storage part storing information representing a combination of the components of the image sensor and data to be used when the image sensor comprising the components indicated by the combination executes the process, wherein each of the components comprises a non-volatile memory storing information for specifying the component, the module configuration notification method comprising:
collecting the information for specifying the component stored in the memory of each of the components and the information representing the combination of the components of the image sensor from the image sensor through a collection part of a computer;
comparing a combination of the components stored in the memory of each of the components and the combination of the components of the image sensor represented by the information stored in the storage part based on the information collected by the collection part through a comparison part of the computer; and
sending a notification based on a result of comparison of the comparison part through a notification part of the computer, wherein when the result of comparison indicates that the combination of its components specified by the information collected by the collection part does not match the combination of the components of the image sensor represented by the information stored in the storage part, the notification part sends a notification that the combinations of the components do not match, wherein the image sensor further comprises an operation setting part setting an operation related to the notification of the notification part when the combination of the components specified by the information collected by the collection part does not match the combination of the components of the image sensor represented by the information stored in the storage part, and the notification part operates according to the operation set by the operation setting part.

* * * * *